No. 674,095. Patented May 14, 1901.
G. A. OVERSTROM.
SAMPLER.
(Application filed Dec. 8, 1900.)
(No Model.) 3 Sheets—Sheet 2.
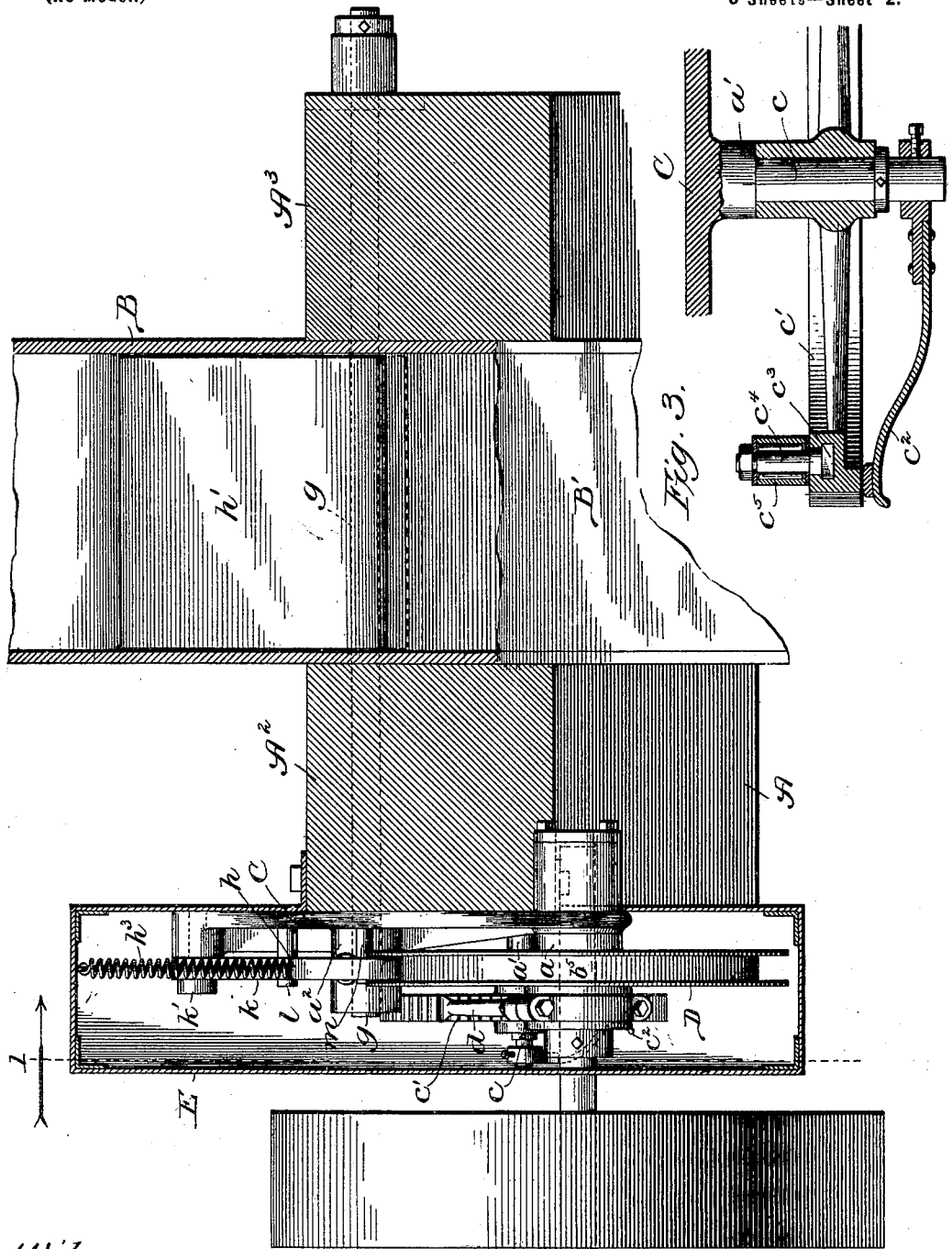

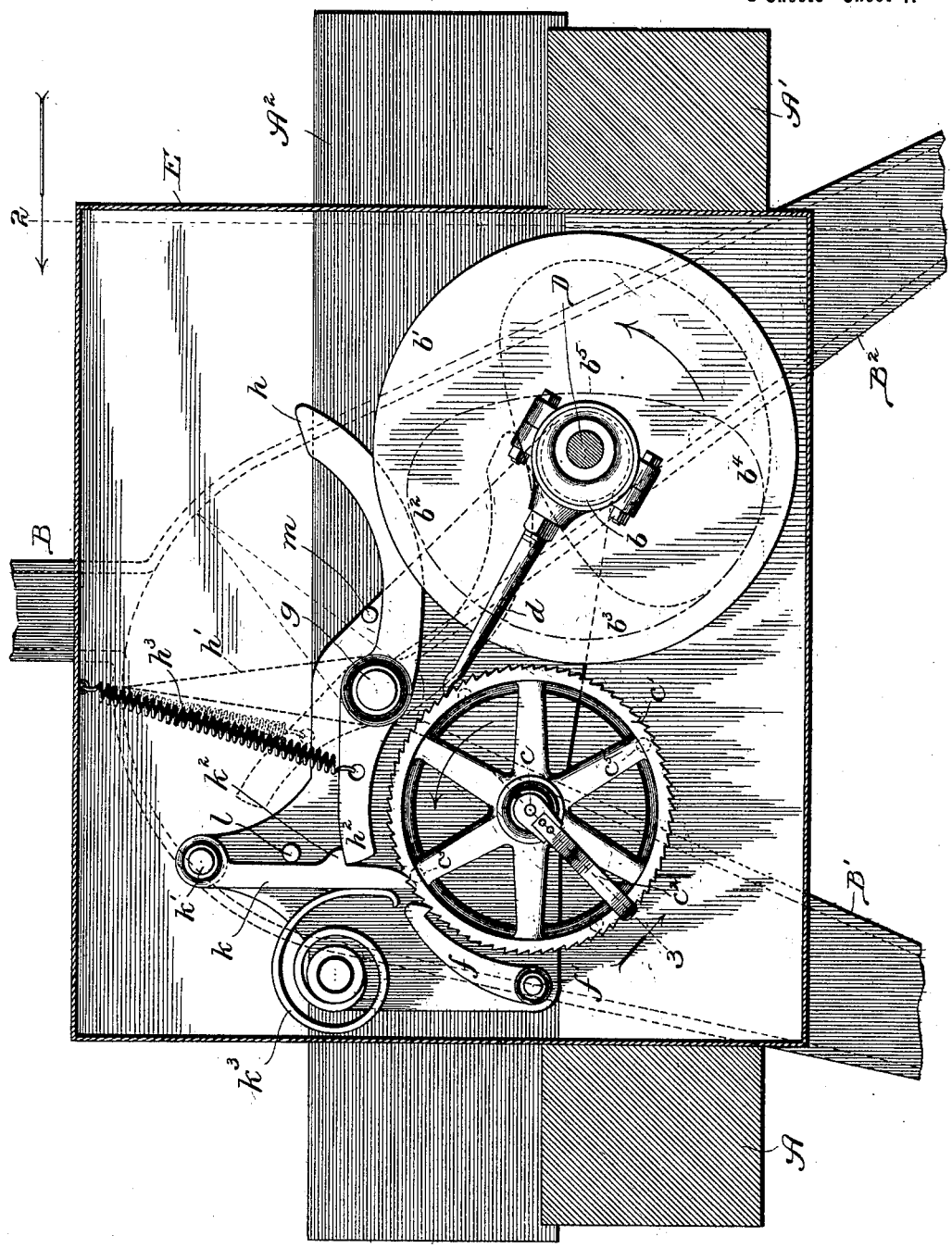

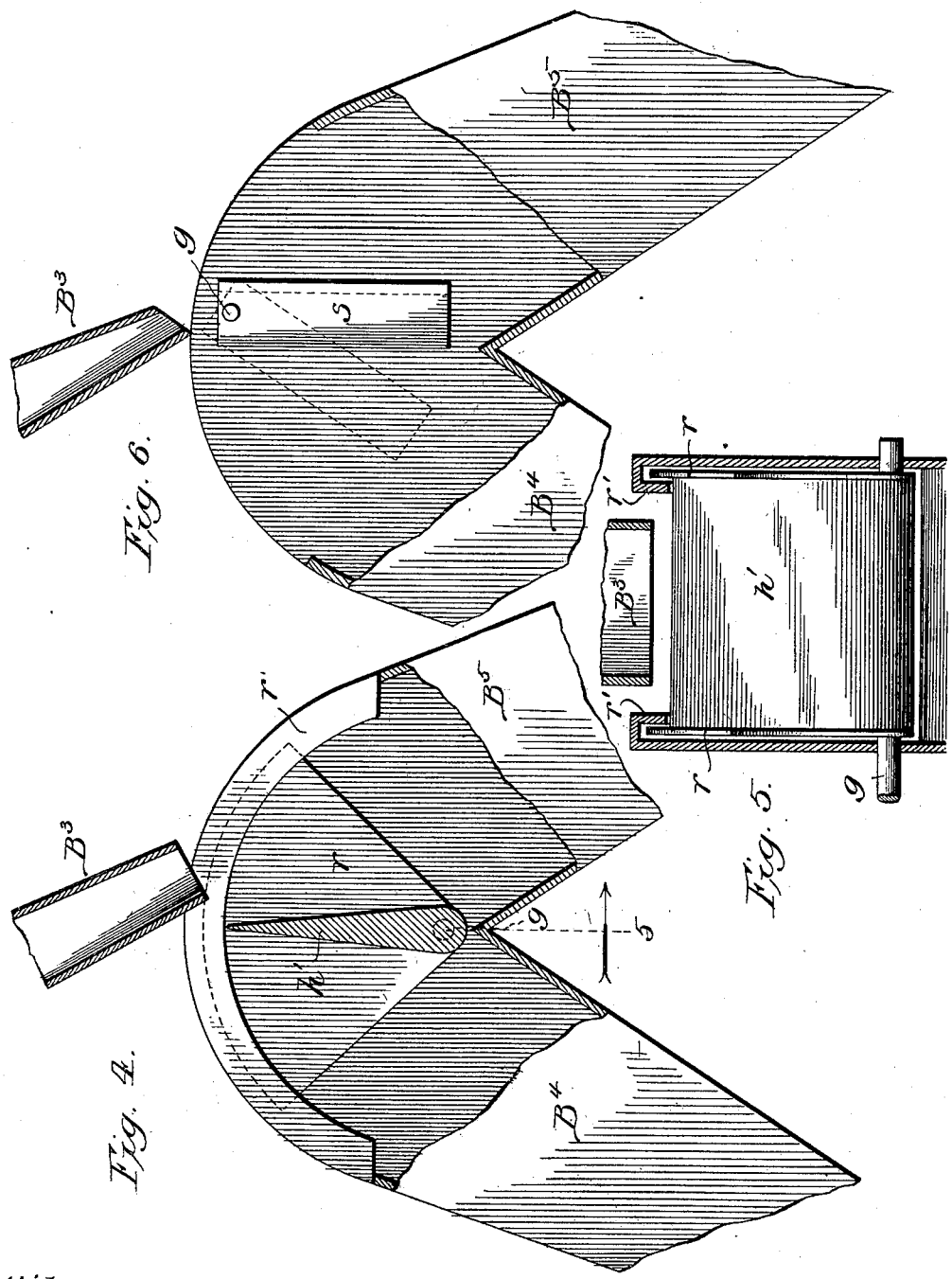

UNITED STATES PATENT OFFICE.

GUSTAVE A. OVERSTROM, OF ANACONDA, MONTANA.

SAMPLER.

SPECIFICATION forming part of Letters Patent No. 674,095, dated May 14, 1901.

Application filed December 8, 1900. Serial No. 39,221. (No model.)

*To all whom it may concern:*

Be it known that I, GUSTAVE A. OVERSTROM, a citizen of the United States, residing at Anaconda, in the county of Deerlodge and State of Montana, have invented a new and useful Improvement in Samplers, of which the following is a specification.

My invention relates particularly to samplers for use in obtaining samples from coarse ores, though certain features of the invention are valuable in connection with samplers for other purposes.

My object is to provide a sampler of generally-improved construction which shall be of very simple structure and which shall be very durable and efficient in operation.

My invention is illustrated in its preferred form in the accompanying drawings, in which—

Figure 1 is a vertical section taken as indicated at line 1 of Fig. 2; Fig. 2, a vertical section parallel to the main shaft of the machine and taken as indicated at line 2 of Fig. 1; Fig. 3, an enlarged broken section taken as indicated at line 3 of Fig. 1; Figs. 4 and 5, details of a modification of the feed-chute, and Fig. 6 a detail of another modification thereof.

The operative parts may be supported on any suitable frame. In the drawings there are shown parallel timbers A A', extending parallel to the main shaft of the machine, and cross-timbers $A^2 A^3$, forming a rectangle with the first-mentioned timbers. Between the members $A^2$ and $A^3$ is supported a spout B, communicating with main and sample branch spouts B' $B^2$. Firmly secured to the timber $A^2$ is a metallic frame member C, provided with bearings $a$, $a'$, and $a^2$. The bearing $a$ receives the main shaft D, which is provided with an eccentric $b$ and a cam-wheel $b'$, having a cam of the outline indicated in dotted lines at $b^2 b^3 b^4 b^5$. At the bearing $a$ is fixed a stud $c$, on which is journaled a ratchet-wheel $c'$, which is engaged near its periphery, Fig. 3, by the free end of a spring $c^2$, fixed to the free end of the stud $c$. At its opposite side the ratchet-wheel is provided near its periphery with an annular channel $c^3$, which receives the heads of bolts $c^4$, upon which are journaled latch-engaging rollers $c^5$. The eccentric $b$ of the main shaft is provided with a pawl or push-bar $d$, which engages the teeth of the ratchet-wheel $c'$. A gravity-held pawl $f$, pivoted at $f'$, serves to prevent retraction of the ratchet-wheel. At the bearing $a^2$ is journaled a deflector rock-shaft $g$, which, as shown in Fig. 1, extends through the base of the junction of the spouts B' $B^2$. To this shaft is fixed a cam-engaging rock-arm $h$, which contacts with the cam-wheel $b'$ and is held in correct relationship therewith by suitable flanges thereon and a vibratory deflector $h'$, which serves to direct the total stream from the chute B to the main branch discharge-spout $B^2$ or to the sample branch spout B', as desired. The arm $h$ is provided with a latch-engaging arm or extension $h^2$, with which connects a spring $h^3$, secured to a stationary part. A latch $k$, pivoted at $k'$, is provided with a lug $k^2$, which engages a slightly-inclined surface at the end of the arm $h^2$ and serves to hold the cam-engaging arm $h$ normally out of engagement with the cam. A spring $k^3$ of sufficient strength to force the latch $k$ inwardly and raise the arm $h$ from engagement with the cam is fixed to a stationary part and bears against the rear edge of the latch, as shown. A suitable casing E is provided for housing the operative parts. Fixed studs $l$ and $m$ serve to confine the movements of the latch $k$ and the arm $h$.

The upper portions of the branch spouts B' and $B^2$ are curved, as shown in Fig. 1, to permit vibration of the deflector $h'$. The sampler may receive its supply from a crusher or from any conveying-spout. By preference the spout B is located mainly over the branch discharge-spout $B^2$, and the deflector $h'$, viewed as indicated in Fig. 1, remains for the most of the time at the left of the spout B. The arm $h$ remains for the most of the time out of contact with its cam. At each revolution of the main shaft the ratchet-wheel $c'$ is advanced one tooth. When a latch-engaging roller $c^5$ comes in contact with the latch $k$, the latter is disengaged from the adjacent end of the arm $h^2$ and the arm $h$ is allowed to drop onto the cam. The revolution of the cam-wheel is so timed that when a drop occurs the arm $h$ first engages a high portion of the cam, and immediately thereafter a low portion of the cam passes beneath the arm and allows said arm, assisted by the spring $h^3$, to move the rock-shaft $g$, thereby throwing the deflector $h'$ to the right-hand side of the chute B, thereby deflecting the entire stream of falling material for a moment into the sample-spout B'. The high portion of the rotating cam quickly engages the arm $h$ again and raises the same sufficiently to permit the shoulder $k^2$ of the latch $k$ to engage the extreme end of the inclined surface at the extremity of the arm $h^2$, after which the spring $k^3$ is enabled to force the lug $k^2$ completely over said inclined surface, thereby raising the arm $h$ out of contact with the cam. Thus unnecessary wear upon the cam is avoided.

From the foregoing description it will be understood that power is applied at the shaft D, and said shaft rotates many times during the interval occurring between the intermittent movements of the rock-arm $h$; and that the rock-arm $h$ remains depressed only throughout a portion of the revolution of the shaft D. As the deflector depends for its movement upon the movement of said rock-arm, it follows that said deflector remains for the most time in position to direct material to the main branch spout, as stated. It will be readily understood that the length of the periods between the intermittent movements of the arm $h$ may be regulated by regulating the number of studs or cam-rollers for engaging the latch $k$. By making the latch-engaging rollers or studs adjustable their number may be increased or diminished at will and the requisite spacing effected.

In Figs. 4 and 5 is illustrated a modification of the chutes through which the material passes. In these figures, $B^3$ represents the main feed-chute, and $B^4$ $B^5$ the branch chutes. In this construction the deflector $h'$ is provided at its vertical ends with sector-like flanges $r$, while the upper portion of the branch chutes $B^4$ $B^5$ (here detached from the chute $B^3$) is made circular and provided with lateral internal curved flanges $r'$, formed with flange-receiving grooves. Fig. 5 illustrates the manner in which the flanges $r$ work within the grooves afforded by the flanges $r'$. The chute $B^3$ is of less width than the branch chutes, and from Fig. 5 it will be readily understood that it will be impossible for material to become wedged between the edges of the deflector and the walls between which the deflector works.

In Fig. 6 the chutes $B^3$ $B^4$ $B^5$ are practically the same as in Fig. 4; but instead of a deflector of the form of the deflector $h'$ a spout $s$ is provided, the same being connected with the deflector-shaft. It will be understood that the chutes will be correspondingly lowered in this construction to bring the upper portion of the spout $s$ to the level of the deflector-shaft. The full lines show the position of the swinging spout when delivering to one branch chute and the dotted lines its position when delivering to the other branch chute.

I do not claim, broadly, the use of a pivoted spout for distributing the material to the branch chutes; but it is to be understood that the pivoted spout acts as a deflector and may be employed in connection with the other improvements described without departure from my invention. Where the spout $s$ is employed, the shaft $g$ is of course suitably divided and secured to the spout to support the same without passing through it.

A machine of the construction described is of particular value in taking samples from coarse ore as it comes from a crusher, and in many cases the sample ore thus obtained is passed through another crusher to be reduced in size, after which samples are taken for analysis.

Changes in the details of construction within the spirit of my invention may be made. Hence no limitation is intended by the foregoing detailed description except as shall appear from the appended claims.

What I claim as new, and desire to secure by Letters Patent, is—

1. In a sampler, the combination of a main shaft, a cam thereon, a rock-shaft, a rock-arm movable with said rock-shaft and actuated by said cam, a deflector movable with said rock-shaft, a chute above said deflector, main and sample chutes beneath said first-named chute and divided by said deflector, a suitably-journaled ratchet-wheel, a pawl actuated by said main shaft and engaging said ratchet-wheel, a latch-engaging arm movable with said rock-shaft, a latch engaged therewith, and means carried by said ratchet-wheel for disengaging said latch at intervals to permit movement of said rock-shaft, substantially as described.

2. In a sampler, the combination of a chute, main and sample branch chutes beneath the same, a deflector for distributing material to said branch chutes, a rock-shaft carrying said deflector, a rock-arm movable with said rock-shaft, a main shaft and cam thereon actuating said rock-arm, a latch for holding said rock-arm during the period between its intermittent movements, a revolving latch-operating device, and means for transmitting motion from the main shaft to said revolving member, whereby the latter is caused to move said latch at intervals and disengage said rock-arm, substantially as and for the purpose set forth.

3. In a sampler, the combination of a chute, main and sample branch chutes leading therefrom, a deflector separating said branch chutes, a rock-shaft carrying said deflector, a rock-arm fixed to said rock-shaft, a main shaft provided with a cam for actuating said rock-arm and provided also with an eccentric, a pawl carried by said eccentric, a ratchet-wheel engaged by said pawl, a latch-engaging stud carried by said ratchet-wheel, a latch projecting into the path of said stud, and an arm fixed to said rock-shaft and engaged by said latch, substantially as and for the purpose set forth.

4. In a sampler, the combination of a chute, branch main and sample chutes communicating therewith, a deflector separating said branch chutes and normally located to direct the material to the main branch chute, a rock-arm fixed to said shaft, a main shaft provided with a cam for actuating said rock-arm, a latch serving to hold said rock-arm normally elevated, a rotating member provided with means for intermittently disengaging said latch to permit movement of the rock-arm, and connecting means between said main shaft and said rotating member for imparting movement to the latter, substantially as and for the purpose set forth.

5. In a device of the character described, the combination with suitable spouts, of a deflector, a shaft carrying said deflector, a rock-arm fixed to said shaft, a main shaft provided with a cam for engaging said rock-arm, a suitably-journaled ratchet-wheel, a pawl connected with said main shaft and serving to actuate said ratchet-wheel, a latch for holding said rock-arm normally lifted, means carried by the ratchet-wheel for intermittently moving said latch, and a pawl engaging raid ratchet-wheel and serving to prevent retraction thereof, substantially as and for the purpose set forth.

6. In a device of the character described, the combination with suitable spouts of a deflector, a shaft carrying said deflector, a rock-arm fixed to said shaft and provided with a latch-engaging extension, a spring-held latch engaging said extension, said latch and extension being provided with suitably shaped shoulders whereby said rock-arm may be lifted when said latch is forced inwardly by its spring, a main shaft provided with a cam for actuating said rock-arm, a rotating latch-actuating member, and connecting means between said main shaft and said rotating member, whereby the latter is moved to intermittently actuate the latch, substantially as and for the purpose set forth.

7. In a device of the character described, the combination with suitable chutes of a deflector, a shaft carrying said deflector, a rock-arm fixed to said shaft, a main shaft, a cam carried by said shaft for actuating said rock-arm, a ratchet-wheel, means connected with the main shaft for actuating said ratchet-wheel, an extension $h^2$ for said rock-arm, a latch $k$ engaging said extension, a spring bearing against said latch, studs carried by said ratchet-wheel for engaging said latch, and a pawl engaging said ratchet-wheel and preventing retraction thereof, substantially as and for the purpose set forth.

8. In a device of the character described, the combination with suitable chutes of a deflector, a shaft carrying said deflector, a rock-arm fixed to said shaft, a main shaft provided with a cam for actuating said rock-arm, a latch for holding said rock-arm normally elevated, a rotating wheel, adjustably-secured studs carried by said wheel for engaging said latch, and means for moving said ratchet-wheel to cause said studs to intermittently actuate said latch, substantially as and for the purpose set forth.

9. In a device of the character described, the combination with suitable chutes, a deflector, a rock-shaft carrying said deflector, a rock-arm fixed to said rock-shaft, a latch serving to hold said rock-arm normally elevated, a journaled ratchet-wheel, a fixed arm frictionally engaging said ratchet-wheel, a main shaft provided with a cam for engaging said rock-arm, a pawl connected with said main shaft and engaging said ratchet-wheel, and means carried by said ratchet-wheel for intermittently actuating said latch, substantially as and for the purpose set forth.

10. In a device of the character described, the combination with suitable chutes and a deflector, of a rock-shaft carrying said deflector, a frame member C through which said rock-shaft extends, a main shaft extending through said frame member, a journaled ratchet-wheel supported by said frame member, a pawl connected with the main shaft and engaging said ratchet-wheel, a rock-arm fixed to said rock-shaft, a cam on the main shaft for actuating said rock-arm, a latch serving to hold said rock-arm normally elevated, and means carried by said ratchet-wheel for intermittently actuating said latch, substantially as and for the purpose set forth.

11. In a sampler having main and sample branch chutes provided at their upper portions with curved lateral internal flanges formed with flange-receiving grooves, a deflector vibrating about an axis at its lower end and provided with vertical end flanges projecting upwardly into said grooves and co-acting with the flanges of said chute, and a supply-chute above said deflector.

12. In a sampler, branch chutes $B^4$ $B^5$ joined at their upper ends and provided with lateral internal curved flanges $r'$, a deflector vibrating about an axis at its lower end and provided with flanges $r$ which work between the flanges $r'$ and the lateral walls of the branch chutes, and a supply-chute above said deflector.

GUSTAVE A. OVERSTROM.

In presence of—
 CHARLES B. FALOR,
 C. M. SAWYER.